United States Patent
Lombardi et al.

(10) Patent No.: US 10,353,381 B2
(45) Date of Patent: Jul. 16, 2019

(54) METHOD TO EXTEND MES FUNCTIONALITIES IN A MESSAGE ROUTING SYSTEM

(71) Applicant: SIEMENS AKTIENGESELLSCHAFT, Munich (DE)

(72) Inventors: Paolo Lombardi, Castelnouvo di Garfagnana (IT); Paolo Olmino, Genua (IT)

(73) Assignee: Siemens Aktiengesellschaft, Munich (DE)

( * ) Notice: Subject to any disclaimer, the term of this patent is extended or adjusted under 35 U.S.C. 154(b) by 134 days.

(21) Appl. No.: 15/684,504

(22) Filed: Aug. 23, 2017

(65) Prior Publication Data

US 2018/0059654 A1 Mar. 1, 2018

(30) Foreign Application Priority Data

Aug. 23, 2016 (EP) ..................... 16185260
Jul. 24, 2017 (EP) ..................... 17182753

(51) Int. Cl.
*G06F 3/00* (2006.01)
*G05B 19/418* (2006.01)
*G06F 9/54* (2006.01)

(52) U.S. Cl.
CPC .......... *G05B 19/4188* (2013.01); *G06F 9/54* (2013.01); *G06F 9/546* (2013.01);
(Continued)

(58) Field of Classification Search
CPC ........................................ G06F 9/54
(Continued)

(56) References Cited

U.S. PATENT DOCUMENTS

2004/0039468 A1 2/2004 Zahorack et al.

FOREIGN PATENT DOCUMENTS

EP 1391818 A2 2/2004

OTHER PUBLICATIONS

Michael McClellan, Introduction to Manufacturing Execution Systems (Year: 2001).*

(Continued)

*Primary Examiner* — Lechi Truong
(74) *Attorney, Agent, or Firm* — Laurence Greenberg; Werner Stemer; Ralph Locher

(57) ABSTRACT

A process extends manufacturing execution system (MES) functionalities in a domain having MES lineage contextualized entities (MLCEs) and commands. The process includes selecting a command implementing the functionality to be extended; contextualizing the command with a MLCE to obtain an entity contextualized command (ECC); extending the MLCE and the ECC, to obtain an extended MLCE (EMLCE) and an extended ECC (EECC); registering in the routing system a first and second handler of the command in association with the lineage of the MLCE and the EMLCE; and communicating between domains by delivering message(s) including a name of the command and the MLCE or the EMLCE, the routing system selecting the first or the second handler, for executing the functionality or the extended functionality, based on a mapping between the lineage registered for the first or the second handlers in the routing system, and a lineage derived from the message.

11 Claims, 17 Drawing Sheets

(52) U.S. Cl.
CPC ............. *G05B 2219/31001* (2013.01); *G05B 2219/34379* (2013.01); *Y02P 90/22* (2015.11)

(58) Field of Classification Search
USPC ........................................................ 719/310
See application file for complete search history.

(56) References Cited

OTHER PUBLICATIONS

Anonymous: "C3 linearization—Wikipedia", XP055466901, Retrieved from the Internet: URL:https://en.wikipedia.org/w/index.php?title=C3 linearization&oldid=757040037, [retrieved on Apr. 12, 2018], the whole document; 2016.

Barclay K. et al: "Specialization" In: "Object-Oriented Design with UML and Java", XP055467105, ISBN: 978-0-7506-6098-3, pp. 131-165, pp. 133-146; 2004.

Devedzic V et al: "A Framework for Building Intelligent Manufacturing Systems", IEEE Transactions on Systems, Man, and Cybernetics: Part C: Applications and Reviews, IEEE Service Center, Piscataway, NJ, US, vol. 29, No. 3, 1, pp. 422-439, XP000849109, ISSN: 1094-6977, DOI: 10.1109/5326.777077, pp. 423-425; 1999.

Barclay K. et al: "Object Technology" In: "Object-Oriented Design with UML and Java", XP055467103, ISBN: 978-0-7506-6098-3, pp. 1-18, pp. 5-10, pp. 12-16; 2004.

Cheng Fan-Tien, et al: "Development of a system framework for the computer-integrated manufacturing execution system: A distributed object-oriented approach"; International Journal of Computer Integrated Manufacturing; vol. 12, No. 5, pp. 384-402, XP055223464, GB, ISSN: 0951-192X, DOI: 10.1080/095119299130137, the whole document; 1999.

Furicht Reinhard, et al: "A Component-Based Application Framework for Manufacturing Execution Systems in C# and .NET", XP055356648, Retrieved from the Internet: URL:http://dl.acm.org/ft gateway.cfm?id=564117&ftid=83536&dwn=I&CFID=914033795&CFTOKEN=42787623, retrieved on Mar. 20, 2017, pp. 169-170, pp. 172,176; 2002.

\* cited by examiner

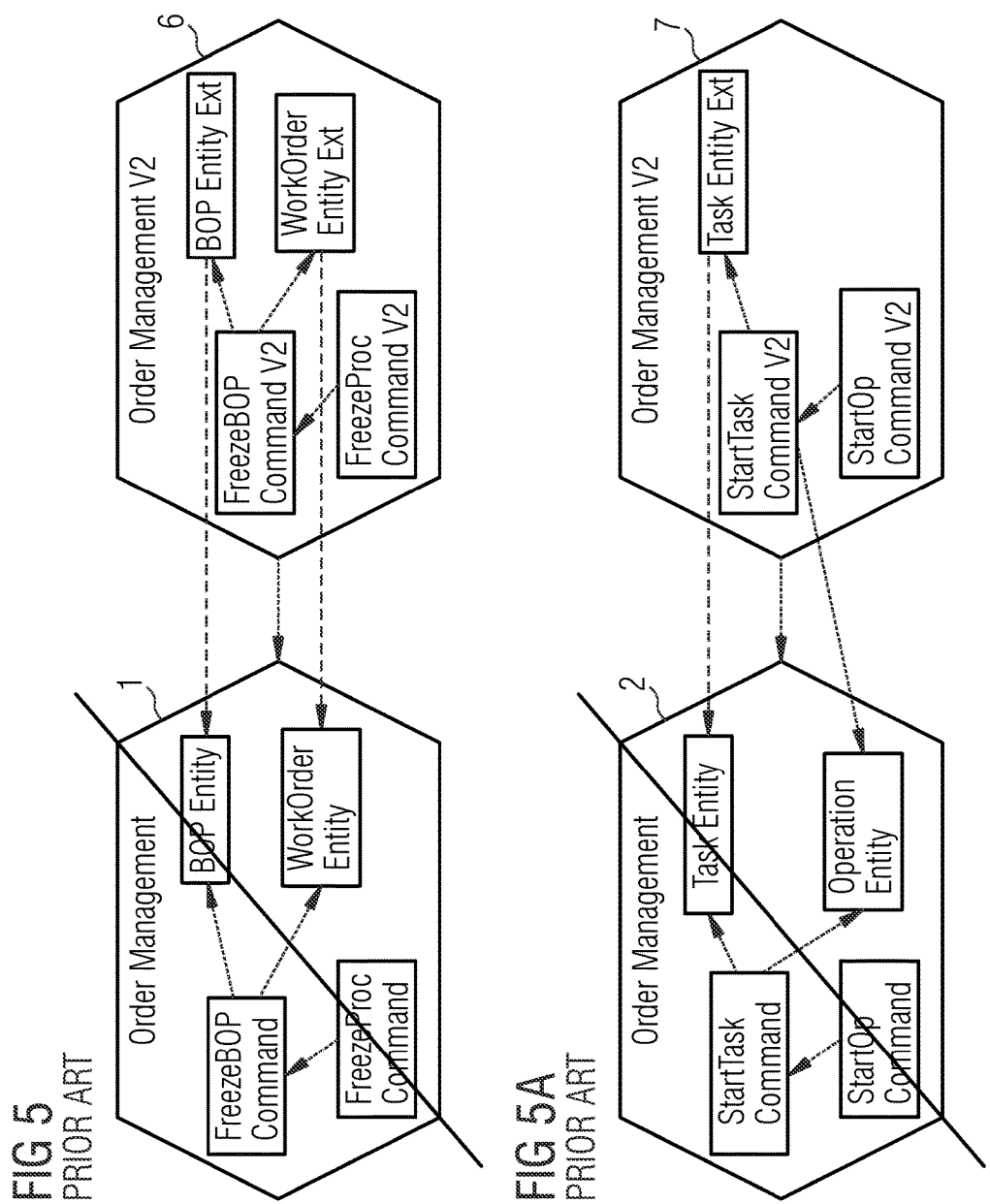

FIG 9
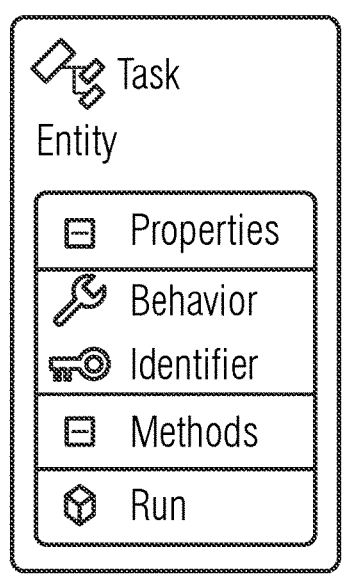
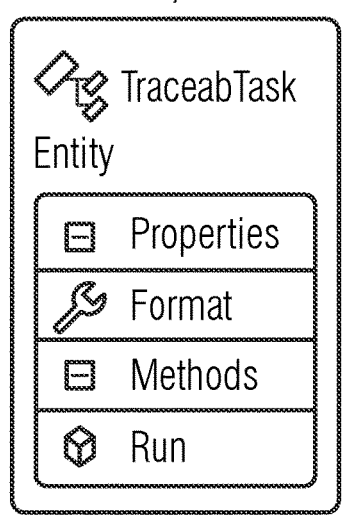
FIG 10
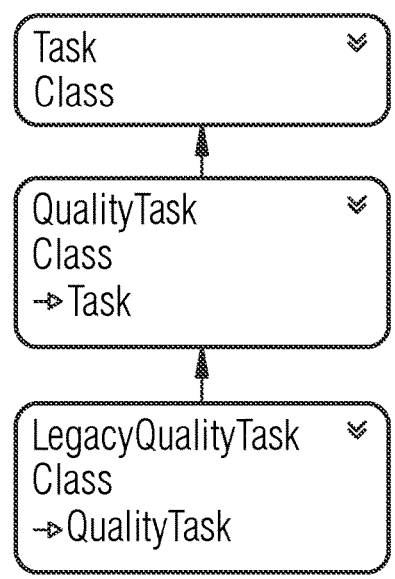

METHOD TO EXTEND MES FUNCTIONALITIES IN A MESSAGE ROUTING SYSTEM

CROSS-REFERENCE TO RELATED APPLICATION

This application claims the benefit, under 35 U.S.C. § 119, of European patent applications EP 17182753.8, filed Jul. 24, 2017 and EP 16185260.3, filed Aug. 23, 2016; the prior application is herewith incorporated by reference in its entirety.

BACKGROUND OF THE INVENTION

Field of the Invention

The present invention relates to a process and to a system to extend MES functionalities in a message routing system-based system according to the preamble of the independent claims.

As known, a manufacturing execution system (MES) is an information technology (IT) layer that integrates business systems (e.g. ERP) and production control systems of a manufacturing organization. MES drives effective execution of manufacturing operations, by managing production operations from point of order release to manufacturing, to product delivery into finished goods, and by providing information about production activities across the manufacturing organization and supply chain.

The MES functionalities, consisting of several different business components or business services, are implemented in "domain" of a domain driven design architecture ("Domain-Driven Design", Evans, Eric (FRW)).

FIG. 1 schematically exemplifies three domains: a first domain, defining a core domain for Order Management, and a second and a third domain, defining two peripheral domains or bounded contexts, Tool Management and Quality Management, respectively. Each domain interacts with other domains and collaborate to control the production and to account for it. Other domains can be added to expand the interaction of the core domain and the peripheral domains to other components.

Preferably, to implement the MES, inversion of control principle is used ("Inversion of Control Containers and the Dependency Injection Pattern", Fowler, Martin). According to this principle, peripheral domains (second and third domains of FIG. 1) are aware of the core domain (first domain of FIG. 1) but the core domain or pre-existing domains are not aware by the peripheral domains. Inversion of control is preferred for MES implementation since custom-written portions of the code in a domain receive the flow of control from a framework, differently from what happens in traditional programming, where it is the custom code that expresses the purpose of the program calls into reusable libraries to take care of generic tasks. Inversion of control increases modularity and extensibility, which is highly desirable in MES system, due to its complexity and needing to evolution/adaptation.

In this respect, however, modularity and extensibility are limited also when inversion of control is used in MES, since domains are mutually interconnected and bundled together, and the high number of interconnections between domains determines complexity in functional design and in source code, as well as in code maintenance. In this respect, the operation of the domains is stored in data organized in logical entities, also known as MES entities, bound by a plurality of relationships. When an event occurs in a domain, the MES entities needed to react to said event are read.

In order to simplify complexity in functional design and in source code, as well as in the code maintenance, and to better fit the needs of specific plants, known message routing system is used. With the message routing system, data of MES entities shared among the domains are transformed from a first data model used in a database into a second data model and the message routing system is arranged to communicate with all domains. At run time, domains interact with one another through the message routing system to control the production line.

For instance with reference to FIG. 2, a source domain and a target domain are represented. Inter-domain communications, such as Remote Procedure Calls, are out-of-process for scalability and maintainability, so they call for the message routing system in the dashed rectangles to convey calls to other domains (components). In presence of the message routing system, which is an inter-process message routing system, a common Remote Procedure Call consists of these steps:

1. Procedure Call is submitted to the message routing system;
2. The message routing system routes the Procedure Call to the single Procedure Handler registered to process it;
3. The Procedure Handler emits a response when the request has been fulfilled; and
4. The caller receives the response.

The message routing system is a software engine implementing the procedural dependencies between domains in an event-oriented manner: that is, instead of having routines that call other routines or subroutines, there are dependencies from events. Message routing system receives events and dispatches them to the appropriate domains. For each domain, adapters (not represented in FIG. 2) adapt the event to the protocol used by the different domains.

Accordingly, with the message routing system based architecture, direct communication between domains is avoided and a certain degree of reduction in complexity in the MES is obtained.

However, the message routing system of this type is not adapted to overcome other problem associated to extension or specialization of domains. Indeed, domains may need to be fine-tuned or modified for functional or infrastructural needs due to evolution of the manufacturing organization. On the other hand, the core domains may need to be extended or specialized, due a corresponding specialization of the manufacturing organization.

Two use cases "1" and "2", presented here below, represent this scenario and the problem of extending or specializing a domain.

The first use case is schematically represented in FIG. 3: a domain 1 (core domain) in a composite architecture deals with production order management; domain 1 checks some security constraints and instantiates (freezes) the structure of a production order (WorkOrder Entity) starting from a bill of process (BOP Entity) using a FreezeBOP Command. In this use case, problems arise when properties are added to the BOP Entity, since it is desirable to modify the behavior (functionalities) of the FreezeBOP command so that it also declare the new properties of the BOP entity in the new WorkOrder Entity, but this is not possible because the framework still relate to the unmodified BOP Entity when the FreezeBOP command is recalled.

The second use case is schematically represented in FIG. 3A: a domain 2 (core domain) in a composite architecture deals with production order management, in particular, an Operation Start command (StartOp command) checks some security constraints and sets the status of all tasks contained in the production operation to Active.

In this second case, another problem arises when a new Task Entity dedicated to the automatic start of some device is added: when the containing operation is started, the task will call specific logic to carry out the tool activation after the default behavior of setting the status of the task to Active. This is due to the fact that the Operation start command recalled by the framework is not aware of the presence of the new Task Entity.

Moreover, there are scenarios where use case "1" and use case "2" are independently encountered (either separately or simultaneously) and must be solved.

The way to extend the MES functionalities in the above mentioned uses cases "1" and "2" according to the prior art message routing system is represented in FIGS. 4 and 4A.

A newer version of the domains, corresponding to the core domains 1 and 2 of FIGS. 3 and 3A, respectively, is given, as schematically represented in FIGS. 4 and 4A with MES domains 3 and 4. In other words, adaptation of the MES functionality is made by implementing both the old logics (domains 1, 2) and the new logics (and domains 3, 4). According to this approach, extension of domains 1 and 2 is made by rewriting, which does not overcome the problem of simplifying complexity and maintenance of the system and code. Indeed, no environment is available in the message routing system based architecture to provide default domains, other than substituting a default port/adapter, and no technique to extend partially or completely domains; just adapters and ports can be added, replaced or removed from the overall scenario.

On the other hand, a framework known in the prior art, allows to design domains in terms of entities, commands and events. In such a framework, functional blocks model bounded domains, so that they can provide a basis for the next implementations. For example, a Discrete Library functional block can serve as a base for a Mechatronic (i.e. Mechanical+Electronic) Functional Block, which in turn can be the base for a specific project. However, also this known framework is limited when extension of a MES functionality is required, since it just allows to extend properties of the entity while commands and events cannot be extended. Hence the only way offered to extend MES functionalities is that of implementing brand new command and event handlers and changing the existing software to call the new commands and handlers.

FIGS. 5 and 5A schematically represent how in the known framework the MES is adapted to support extensions of MES functionalities in the above mentioned uses cases "1" and "2": domains 6 and 7 are developed, which extends the modified entities in old domain 1 and 2, and also new commands are developed, containing both old and new behaviors (functionalities). The old domains must not be called anymore, they just provide a basis for the new domains 6 and 7.

As far as command are concerned, the prior art method based on message routing system relies on a routing which delivers the command call to the one command handler registered to the purpose. For example, in use case "1", the command call FreezeBOP contains the BOP ID and the Work Order ID on which the command must be performed, and is presented to the message routing system with a routing key of the type "FreezeBOP" to the message routing system. The message routing system activates the only command handler registered for "FreezeBOP" to accept that exact routing key. In use case "2", the command call StartOp contains the Operation ID on which the command must be performed, and is presented to the message routing system with a routing key of the type "StartOp". The message routing system activates the only command handler registered in association with "StartOp" to accept that exact routing key. Inside the code of the StartOp command handler, for each task in the operation, a command call StartTask containing the Task ID on which the command must be performed is presented with a routing key of the type "StartTask" to the message routing system. The message routing system activates the only command handler registered with a topic "StartTask" to accept that exact routing key.

Due to the above limitations, the commands to extend MES functionalities according to the prior art suffer for the following drawbacks.

Function based design: the software tools used to design MES based on message routing system architecture do not offer the possibility to design polymorphic commands, so the software engineer must be aware of these limitation not to design unsupported patterns.

Dependency hell: all unchanged commands, in any domain, which depended on the old functionalities, for instance on the FreezeBOP in the example given above (e.g. FreezeProc Command), will start the new logic contained in the latter version by calling the newer command; to avoid this, all dependent code must be reworked.

Code reduplication and dead code: if the base code, e.g. based on behavior (functionalities) regarding the security constraints, common to the two versions, changes, the code will have to be modified on the two versions. Otherwise, if Version 1 code is not useful anymore, for instance in case of obsolescence, it will be still present but not used in subsequence builds.

Opaque function calls: the domains invoking the FreezeBOP command call will have to make sure to align all versions of commands and entities, since they only have evidence of the command call isolated interface.

Cyclomatic complexity: since some scenarios require the developer to write newer or specialized code next to existing code, if behaviors (functionalities) must be extended more than once, all combination must be accounted for, calling for a complex set of nested conditions. For different reasons, the developers will have to modify the same section of code.

FIG. 6 schematically represents the core base domain overridden by two peripheral domains, according to the prior art.

SUMMARY OF THE INVENTION

The technical problem at the base of the present invention is supporting extensions and/or specialization of MES functionalities in a message routing system, in particular supporting such specializations using Domain Driven Design, reducing complexity in functional design and in source code, as well as in code maintenance, avoiding code reduplication or dead code, simplifying dependencies, and integration of new domain with previous or pre-existing domains.

According to the present invention, the above mentioned technical problem is solved by a process to extend a functionality of a manufacturing execution system (MES) in a computer managed manufacturing execution system (MES) based on a messaging routing system for controlling discrete production lines and/or automotive industries. The MES functionality is implemented in a domain of a domain driven design used to design the Manufacturing Execution System (MES), the domain including at least a MES lineage contextualized entity and a command. The lineage of the lineage contextualized entity is a recursively resolved inheritance string of the MES lineage contextualized entity and the context of the MES lineage contextualized entity is a model of the domain with predetermined boundaries, in which the entity is defined, the domain being programmed to communicate to at least another domain of the domain driven design of the MES System through a message of the messaging routing system. The invention is characterized by:

a) selecting a command implementing the functionality to be extended;
b) contextualizing the command with the MES lineage contextualized entity to obtain an entity contextualized command, the step of contextualizing including encapsulating and hiding the entity contextualized command into the MES lineage contextualized entity;
c) extending the MES lineage contextualized entity and the entity contextualized command which implement the selected functionality, to obtain an extended MES lineage contextualized entity and an extended entity contextualized command, corresponding to the extended functionality, said step of extending including encapsulating and hiding the extended entity contextualized command into the extended MES lineage contextualized entity;
d) registering into the message routing system a first handler of the command, in association with the lineage of the MES lineage contextualized entity, and a second handler of the command, in association with the lineage of the MES extended lineage contextualized entity;
e) the communication of the domain with at least another domain through the messaging routing system includes delivering from a domain a message on the messaging routing system including a name of the command and the MES lineage contextualized entity or the extended MES lineage contextualized entity; and
f) the messaging routing system selects the first handler, for executing the functionality, or the second handler, for executing the extended functionality, based on a mapping between the lineage registered in the messaging routing system for the first and second handlers, and a lineage derived from said message in the messaging routing system.

Advantageously, according to the method of the present invention, although the command is defined using a not polymorphic paradigm in the domain driven design, it may be provided with a polymorphic behaviors, i.e. providing a functionality or an extended functionality, by being contextualized to the entity and extended together with it.

More particularly, both the entity and the command are defined using the not polymorphic paradigm, for instance a paradigm not object oriented. The entity is provided with the lineage, i.e. with a string associated to the entity and adapted to be recursively processed to determine substring associated to other entities from which the entity has inherited. The entity is bounded to a context. For instance, the entity may be a library which has inherited from another library. The entity is also indicated in the following description with MES lineage contextualized entity.

The command is encapsulated in the entity so that the code of the command is hidden inside the entity and is also bounded to the same context to which the entity is bounded. The first handler of the command is registered in the message routing system. The command implements the functionality. The command is also indicated in the following description with entity contextualized command.

To extend the functionality, first the entity is extended. In this respect, a lineage for the extended entity is provided, i.e. a string associated to the extended entity and adapted to be recursively processed to determine substrings associated to other entities, including the entity, from which the extended entity has inherited. The extended entity is bounded to the same context of the entity. The extended entity may be an extended library which has inherited from another library associated to the entity. The extended entity is also indicated in the following description with extended MES lineage contextualized entity.

The extended command implementing the extended functionality is encapsulated in the extended entity so that the code of the extended command is hidden inside the extended entity and is also bounded to the same context to which the extended entity is bounded. The second handler of the extended command is registered in the message routing system. The extended command is also indicated in the following description with extended entity contextualized command.

Advantageously, according to the method steps explained above, the command defined using the not polymorphic paradigm may have a polymorphic behavior because, when it is delivered to the message routing system, it executes the functionality or the extended functionality depending on, respectively, the lineage of the entity which is delivered to the message routing system, although also the entity is defined using a not polymorphic paradigm.

The word "extension" of MES functionality also cover "specialization" of MES functionality, given that the same steps of the process of the present invention may be executed to implement an extension or a specialization of commands available inside one or more domains of the MES, i.e. advantageously supporting both the uses cases "1" (extension) and "2" (specialization) modification to provide polymorphic behavior.

The step of registering the lineages into the message routing system contains storing, in association with the first handler, a first string containing, for instance through a concatenation by a special character, the name of the command and the name of the MES entity, and, in association with the second handler, a second string containing, for instance through a concatenation by the special character, the name of the command with the name of the MES entity and with the name of the extended MES entity.

The step of deriving the lineage from the message in the message routing system contains forming a topic string obtained by:

a) deriving the MES entity from the extended MES entity and forming the topic string by concatenating recursively in the message routing system the name of the MES entity with the name of the extended MES entity and the name of the command, if the message includes the extended MES entity;
b) forming the topic string by concatenating in the message routing system the name of the MES entity with the name of the command, if the message includes the MES entity.

The process may include the step of further extending one or more time the extended MES entity and the command, to obtain a further extended functionality. Wherein the step of registering registers a further handler of the command including a lineage of the further extended MES entity or instance instantiated therefrom; and the communication is made delivering on the message routing system the message including the command and the further extended entity. The message routing system selects the further handler when the lineage registered in the message routing system for the further handler is mapped to a lineage derived from the message in the message routing system.

The step of registering the handlers of the command in the message routing system includes:

a) storing the first string and the second string (or further strings), as a first and second routing key (respectively, further routings keys), in a routing table of the message routing system; and b) mapping the first and second key to the first and second handlers, respectively, and wherein the step of mapping the lineage registered in the message routing system for the command and a lineage derived from the message in the message routing system contains the step finding the routing key in the routing table having the longest lexicographic similarity with the topic string.

The routing table includes at least two interfaces, including:

a) an interface "Add functionality" to register a handler in the routing table;

b) an interface "Route functionality" to map a routing key to the handler. The "Route functionality" returns the handler associated to the routing key matching the lineage derived from the message in the message routing system, by means of the following steps:

selecting from the routing table all the routing keys starting with letters corresponding to the name of the command in the message;

among the selected routing keys, finding the deeper routing key, wherein a routing key is deeper than another routing key among the selected routing keys when the routing key includes more MES entities concatenated with the special character than the another routing key, the deeper routing key corresponding to the most extended functionality;

returning the handler associate to the deeper routing key.

Each of the domains is a domain of a domain driven design (architecture).

In an aspect of the present invention, the domain driven design architecture includes a plurality of servers, each server implementing one of the domain and communicating to other servers through the message routing system.

Each of the domains belong to a first layer of the domain driven design architecture and the message routing system belong to a second layer at a lower level in the domain driven architecture with respect to the first layer. The second layer includes the handlers of the commands and the message is delivered to the message routing system from the first layer being unaware of the handler.

Each command is addressed using an entity and the MES entity.

The technical problem identified above is also solved by a system to extend a functionality of a manufacturing execution system (MES) in a computer managed manufacturing execution system (MES) based on a message routing system for controlling discrete production lines and/or automotive industries. The MES functionality is implemented in a domain of a domain driven design used to design the manufacturing execution system (MES). The domain includes at least a MES lineage contextualized entity and a command. The lineage of the lineage contextualized entity is a recursively resolved inheritance string of the MES lineage contextualized entity and wherein the context of the MES lineage contextualized entity is a model of the domain with predetermined boundaries, in which the entity is defined. The domain is programmed to communicate to at least another domain of the domain driven design in the MES System through a message of the message routing system. The MES is programmed to:

a) select a command implementing the functionality to be extended;

b) contextualize the command with the MES lineage contextualized entity to obtain an entity contextualized command, the program to contextualize including a tool for importing the entity contextualized command into a portion of the MES lineage contextualized entity which is hidden outside the MES lineage contextualized entity;

c) extend the MES lineage contextualized entity and the entity contextualized command which implement the selected functionality, to obtain an extended MES lineage contextualized entity and an extended entity contextualized command, corresponding to the extended functionality, the step of extending including a tool for importing the extended entity contextualized command into a portion of the extended MES lineage contextualized entity which is hidden outside the extended MES lineage contextualized entity;

d) register into the message routing system a first handler of the command, in association with the lineage of the MES lineage contextualized entity, and a second handler of the command, in association with the lineage of the MES extended lineage contextualized entity;

e) deliver from a domain a message on the messaging routing system including a name of the command and the MES lineage contextualized entity or the extended MES lineage contextualized entity to communicate between the domain and at least another domain through the messaging routing system, wherein the messaging routing system is programmed to check a correspondence between the lineage registered in the messaging routing system for the first and second handlers, with a lineage derived from the message in the messaging routing system, and to select the first handler, for executing the functionality, or the second handler, for executing the extended functionality, based on the correspondence.

The problem is also solved by a computer program containing instructions which, when the program is executed by a computer, cause the computer to carry out the steps of the above method.

Furthermore, a computer-readable medium containing instructions which, when executed by a computer, cause the computer to carry out the steps of the method is also adapt to solve the mentioned technical problem.

Other features which are considered as characteristic for the invention are set forth in the appended claims.

Although the invention is illustrated and described herein as embodied in a method to extend MES functionalities in a message routing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 is an illustration schematically representing an extension of the MES component of FIG. 3, according to another prior art process;

FIG. 5A is an illustration schematically representing an extension of the MES component of FIG. 3A, according to the prior art process of FIG. 5;

FIG. 7A is an illustration schematically representing the MES component of FIG. 3A, programmed according to the process of the present invention;

FIG. 8A is an illustration schematically representing an extension of the MES component of FIG. 7A, according to the process of the present invention;

FIG. 9 is an illustration schematically representing a user interface to contextualize commands according to the present invention;

FIG. 10 is an illustration schematically representing an entity lineage of a LegacyQualityTask;

DETAILED DESCRIPTION OF THE INVENTION

Figure 1:
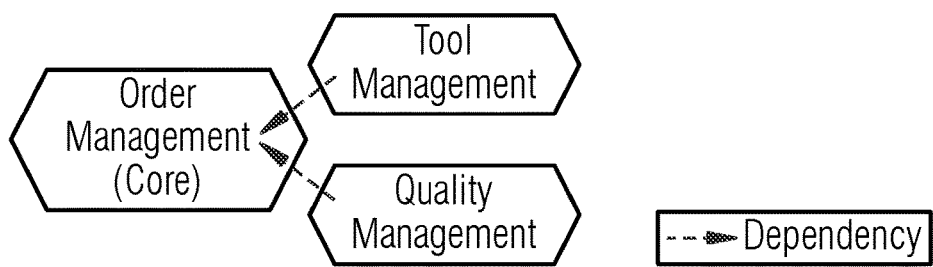
FIG. 1 is an illustration schematically representing three MES components with corresponding dependency according to the prior art.
Figure 2:
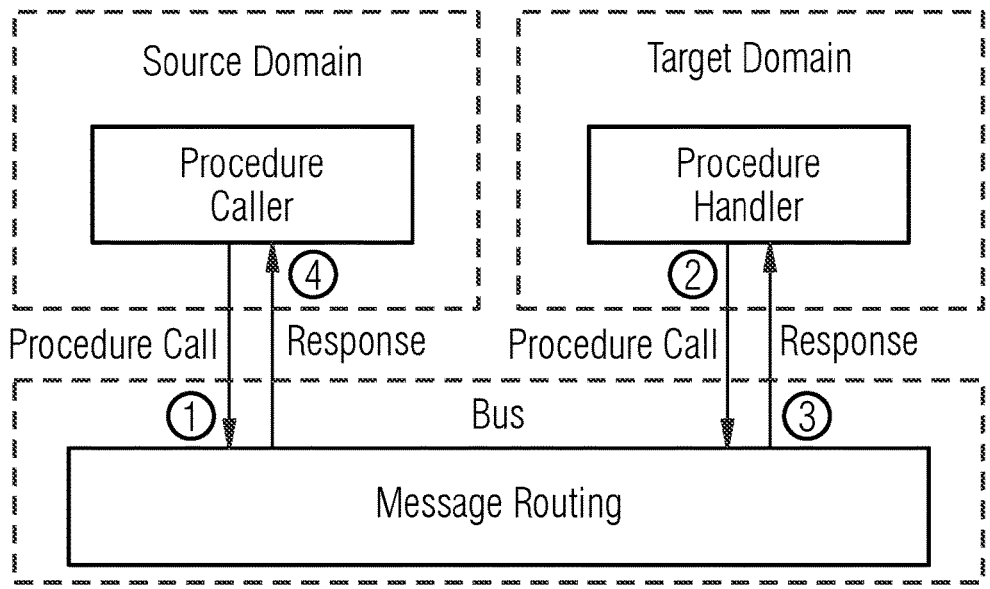
FIG. 2 is an illustration schematically representing a message routing system according to the prior art.

With reference to FIGS. 7-17, it is hereafter described an example of implementation of a process and a system to extend MES functionalities in a message routing system, according to the present invention.

A manufacturing execution system (MES) is an information technology (IT) layer that integrates business systems (e.g. ERP) and production control systems of a manufacturing organization. The MES drives effective execution of manufacturing operations, by managing production operations from point of order release to manufacturing, to product delivery into finished goods, and by providing information about production activities across the manufacturing organization and supply chain.

In the MES, the MES functionalities are implemented in "domain" of a domain driven design architecture. The operation of the domains is stored in data organized in logical entities, also referred by 'MES entities', bound by a plurality of relationships. When an event occurs in a domain, the MES entities needed to process it are read. The interaction among domain is based on the message routing system based architecture. For instance, data of MES entities shared among the domains are transformed from a first data model used in a database into a second data model and the message routing system is arranged to communicate with all domains. At run time, domains interact with one another through the message routing system to control the production line.

A computer managed MES according to the process of the present is particularly adapted for controlling manufacturing processes in discrete production lines and automotive industries, for instance automotive assembly lines including a plurality of stations where operations are performed. In automotive assembly lines, for each station, one or more workplaces are configured, each containing the configuration for production operations. At runtime, each workplace contains a vehicle or a part thereof, represented by its production order, wherein each production order contains the actual operations that must be performed on the vehicle. Operator terminals at each workplace may show the operations of the production order that are associated with the workplace, their status and other relevant information.

Among the functionalities that MES includes are resource allocation and status, dispatching production orders, data collection/acquisition, quality management, maintenance management, performance analysis, operations/detail scheduling, document control, process management and product tracking.

The message routing system is a software engine implementing the procedural dependencies between domains in an event-oriented manner. In other words, instead of having routines that call other routines or subroutines, there are dependencies among events. Message routing system receives events or messages and dispatches them to the appropriate domains. For each domain, adapters adapt the event (or message) to the protocol used by the different domains. The message routing system allows avoiding direct communication between domains and a certain degree of reduction in complexity is obtained by delegating the inter-domain communication to a lower level which is implemented by the message routing system.

Inter-domains communications through the message routing system is improved to support fine-tuning of domains or modification thereof, for functional or infrastructural needs due to evolution of the manufacturing organization, as well as supporting extension or specialization of domains, due a corresponding extension or specialization of the manufacturing processes in the organization.

The process is adapted to be applied to a composite architecture where different domains interact by a layer based on a message routing system. When a domain needs to perform a "Remote Procedure Call", the message routing system notifies all the domains that a task must be performed (the procedure call) and the single domain capable of executing the task executes it transactionally, i.e. based on a procedure handling.

Simatic IT UAF of Siemens Corporation may be used as a base for the above mentioned composite architecture. Simatic IT UAF is adapted to manage events which are routed to more than one destination MES component (domain) in a non-transactional way.

According to the process of the present invention, also a transactional execution is supported. Therefore, Simatic IT UAF may be adapted to implement a transitional execution and to support both non-transactional execution and transactional executions.

More particularly, still according to the present invention, polymorphism is provided to the message routing system although command and entities are defined in a not polymorific paradigm.

In order to extend the domains according to the process of the present invention, commands (for instance commands represented in FIGS. 3, 3A of the prior art) bound to the semantics of an existing entity are identified and encapsulated into the existing entity.

Figure 7:
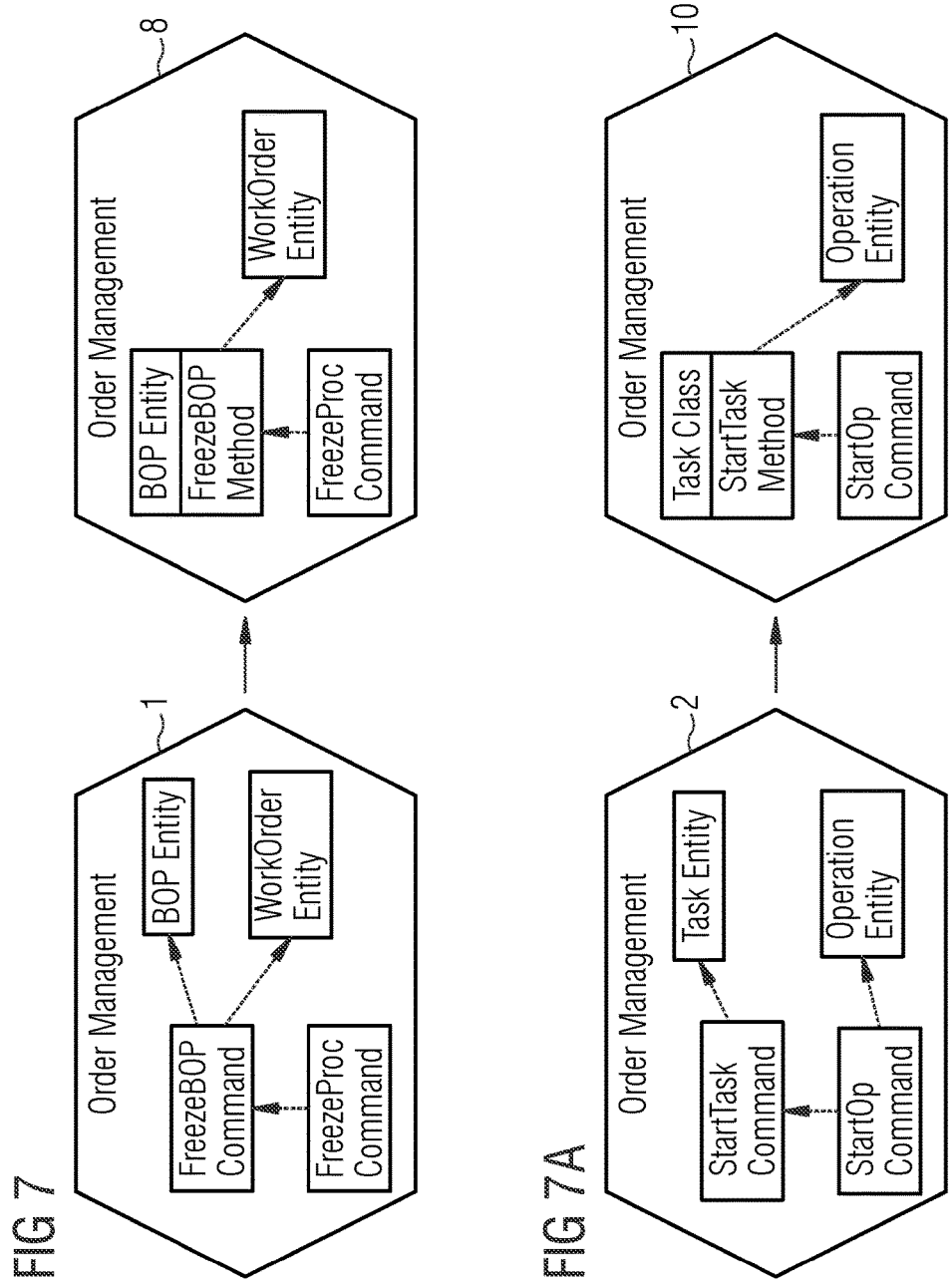
FIG. 7 is an illustration schematically representing the MES component of FIG. 3, programmed according to the process of according to the present invention.

Commands and entities with no logical connection remain unchanged. With reference to FIGS. 7 and 7A, for instance, this happens for command FreezeProc and WorkOrder (FIG. 7) and StartOp and Operation Entity (FIG. 7A).

Figure 3:
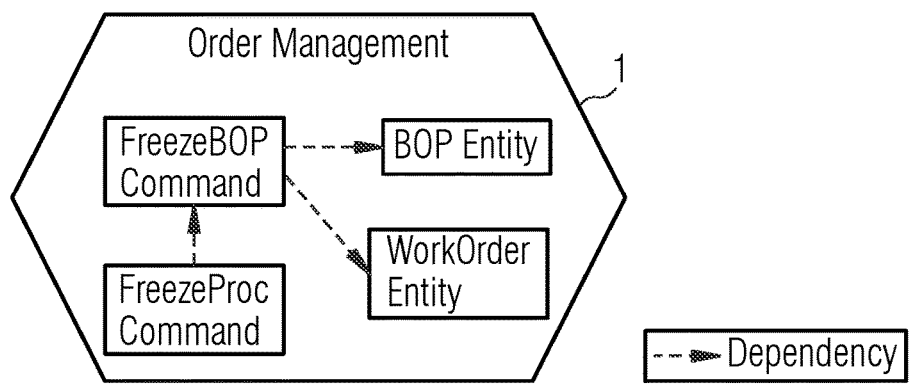
FIG. 3 is an illustration schematically representing a MES component with commands and entities according to the prior art.
Figure 3A:
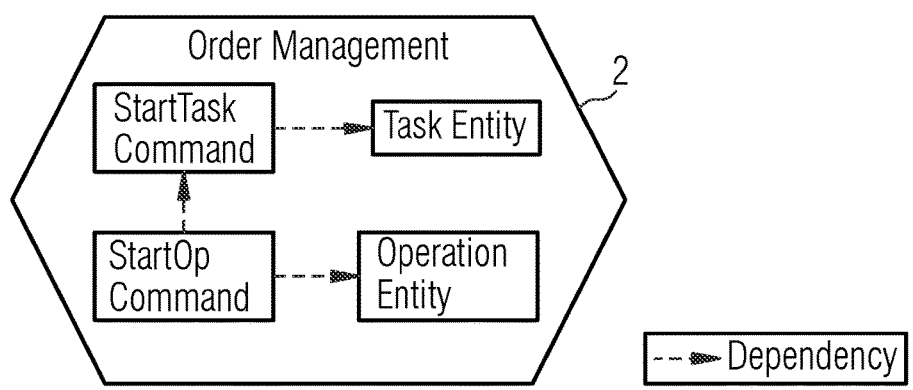
FIG. 3A is an illustration schematically representing another MES component with commands and entities according to the prior art.

These operations are indicated with extensibility refactoring and allows to transform the domain of FIGS. 3 and 3A into domains 7, 7a respectively.

When needs arise to extend the entities contained in the existing domains 7, 7a the following steps are executed:
a) Identifying the entity to be extended; and
b) Extend the relevant parts, including properties or commands.

Figure 4:
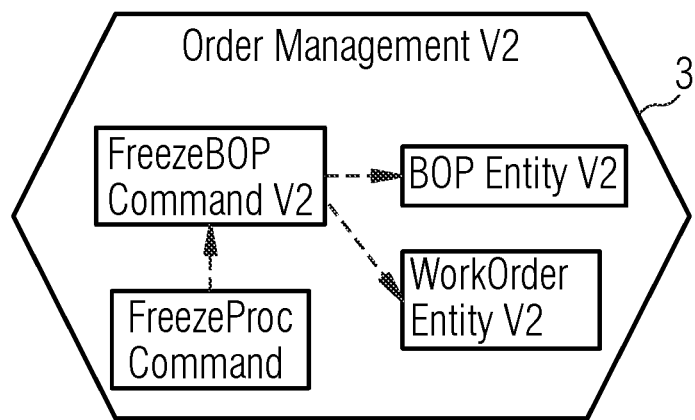
FIG. 4 is an illustration schematically representing an extension of the MES component of FIG. 3, according to a prior art process.
Figure 4A:
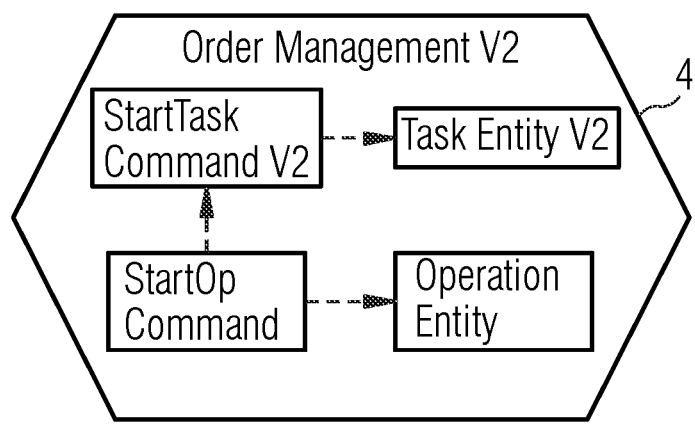
FIG. 4A is an illustration schematically representing an extension of the MES component of FIG. 3A, according to the prior art process of FIG. 4.
Figure 6:
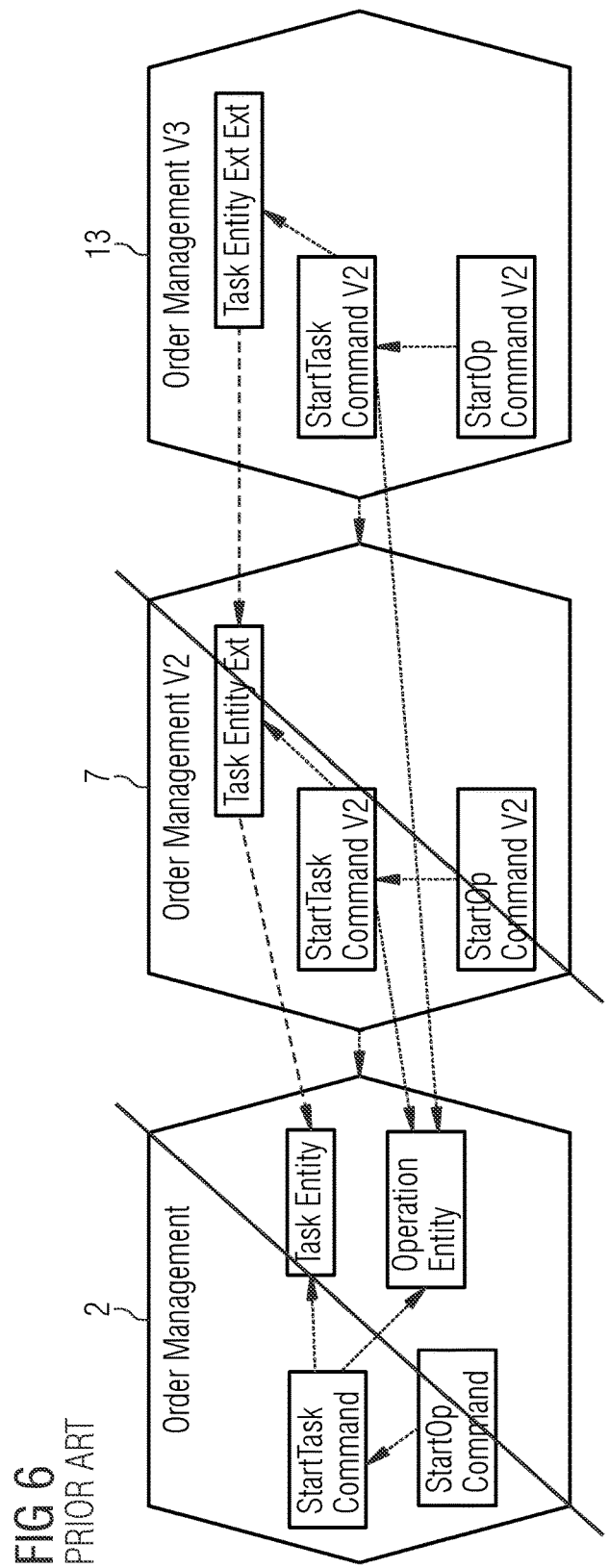
FIG. 6 is an illustration schematically representing a further extension of the MES component of FIG. 5A, according to the prior art process of FIG. 5A.

For example, instead of domains 3, 4 obtained as extension of domains 1, 2 according to the prior art process represented in FIGS. 4, 4A and instead of domains 6, 7 obtained as extension of entity 1, 2 according to the other process disclosed by the prior art and described with reference to Figs. of 5, 5A, according to the process of the present invention, domains 9, 11 are the result of the extension of domains 8, 10 obtained by extensibility refactoring of domains 1,2.

A graphic user interface is provided to support introduction of command call. For instance, starting from a Graphic User Interface already available in Simatic IT UAF, which allows a developer to define entities with properties, the Graphic User Interface is adapted to allow the developer to add command calls, preferably including the following features:
a) Feature to contextualize commands with an existing entity by means of a keyboard or a mouse; and
b) Feature to visualize entities contextualized commands together with properties on a canvas.

FIG. 9 is an example of a Graphic User Interface to contextualize commands according to an aspect of the process of the present invention.

In order to support the extension of the MES functionality, the following steps are also provided:
a) Enabling or developing a routing capable of delivering command calls, preferably including the following entity contextualized commands:
b) Command Handlers topic: "<MethodName>.<EntityLineage>.#"
c) Command Calls routing-key: "<MethodName>.<InstanceLineage>." or
d) Command Calls routing-key: "<MethodName>.<EntityLineage>.", where <MethodName> is the name of the command.

The lineage of an entity is a string that gathers the name of the entity and, recursively, the lineage of its base entity.

FIG. 10 schematically represents the Lineage for a LegacyQualityTask entity (in FIG. 10 entity is indicated with "class").

In the given hierarchy, the lineage of type LegacyQualityTask is: "Task.QualityTask.LegacyQualityTask.".

The reference to "<EntityLineage>" is used to refer to the lineage at compile time, whereas the reference to "<InstanceLineage>" is used to refer to the lineage at run time. Two different string or nomenclatures may be used to distinguish entity contextualized commands at compile time from entity contextualized commands at run time.

Figure 11:
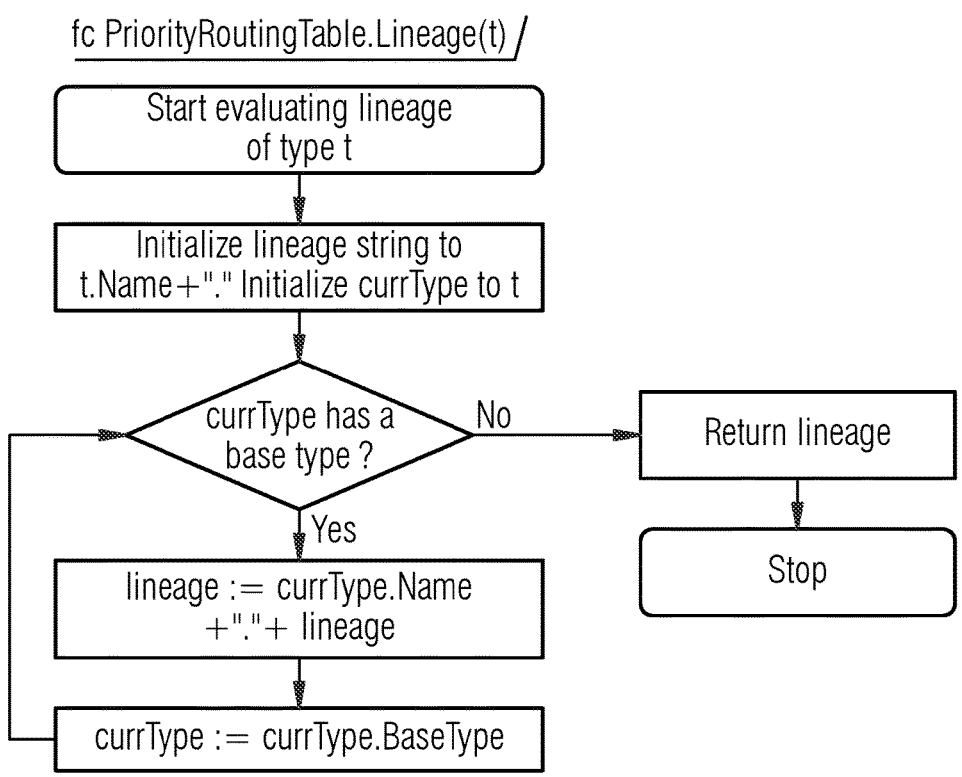
FIG. 11 is a flow chart for evaluating a lineage of a type t.

With reference to the diagram block of FIG. 11, it is schematically given the procedure to start evaluating lineage of a entity (in drawing 11 referred as the "lineage of type").

The lineage is evaluated when a command is registered into the message routing system or when the domain delivers a message to the message routing system as a request of service, including the command name and the entity. The evaluation is made in the lower layer constituted by the message routing system, in order to retrieve the handler of the command to be executed, being the command unknown in the upper layer including the domain making the request.

In the following, some examples of possible implementation of the process are given.

A routing table is stored in the message routing system.

The routing table can be represented by a simple interface having two functionalities:
a) Add functionality, to register a command handler; and
b) Route functionality, to map a routing key to a command handler.

Figure 12:
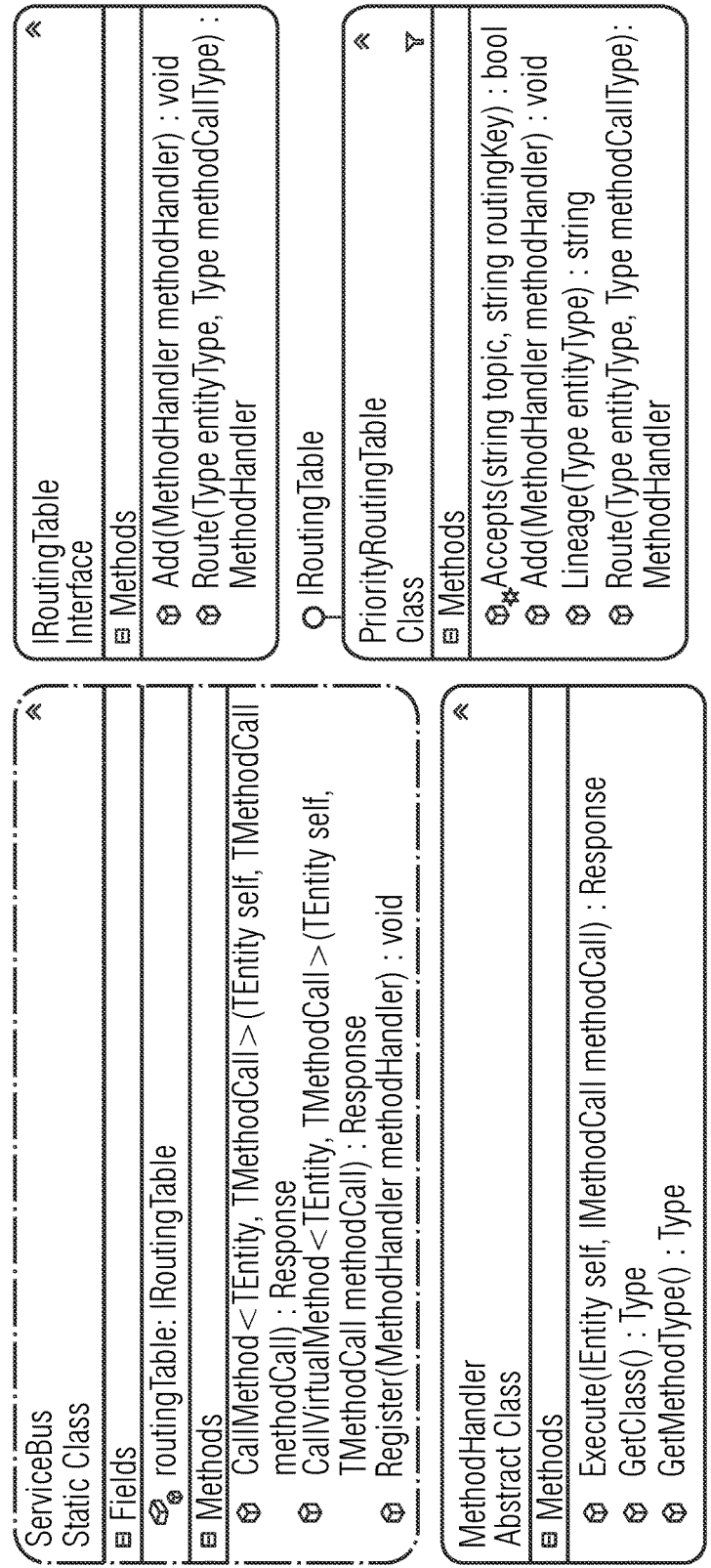
FIG. 12 is a class diagram for a priority routing table.

FIG. 12 represents a class Diagram for Priority Routing Table.

In case of Command routing, any Route function return zero or one handler associated to a routing key that matches the call topic (see below for topic matching and routing key sorting).

The term "topic" relates to a string formed in the lower layer constituted by the message routing system on the base of a message request delivered from a domain in the upper layer for executing a command, such a request including the name of the command and the corresponding type (or class or instance). Advantageously, the domain of the upper layer is not aware of the command or domain to which the request will be forwarded by the message routing system; it is the message routing system that, taking in input the command name and entity, construct a topic to be matched with the routing key in the routing table for retrieving the handler of the command (in the figures also indicated as method).

In the case of the process of present invention, the Route function has the capability to return the handler associated to the first routing key matching the call topic.

The concept of matching a topic with a routing key can be implemented in different ways based on the underlying technologies. For sake of simplicity, the following example makes use of a string comparison with the use of a universal wildcard ("#") but other implementations can be used, considering the actual tool implementing the message routing system. For instance, commercial software widely adopted, such as *RabbitMQ*, may be used to this purpose.

Regarding the implementations of topic/routing key matching, the following is noted.

The need of matching topics to routing key called for by the process of the invention can be implemented in any way satisfying the requirement to test if a given topic "starts with" a given routing key. For instance, topic "a#" will match any string starting with "a". Besides, different implementations may be used, depending on the underlying technologies, also based on different constraint.

Also the concept of sorting topics according to length can be implemented in different ways based on the underlying technologies. For sake of simplicity, the example given below makes use of a string length sorting, but other measures can be used.

Regarding the implementations of routing key sorting, the following is noted.

The need of sorting routing key called for by the command of the present invention can be implemented in any way satisfying the requirement to test if a given routing key "is deeper than" another routing key. For instance, routing key "a.b.c", consisting in three parts, is deeper than routing keys consisting of fewer parts. Another simple way of implementing depth is length comparison, irrespective of internal structure.

Regarding the implementations of routing the first routing key matching the topic, the following is noted.

The algorithm to support the sorted fetch in the Route function is based on the use of a sorted dictionary. The idea of sorting inherently routing keys to obtain a quicker retrieval at runtime is trivial in the prior art but not necessary. Better ad hoc algorithms might be used, if supported by an embedding technology.

The implementation code of the PriorityRoutingTable might be, for instance, in the form:

```
public void Add(MethodHandler methodHandler)
{
string topic = methodHandler.GetMethodType( ).Name +
Lineage(methodHandler.GetClass( ));
routingTable.Add(topic, methodHandler);
}
public MethodHandler Route(Type entityType, Type methodCallType)
{
string routingKey = methodCallType.Name + Lineage(entityType);
KeyValuePair<string, MethodHandler> routingPair = routingTable.First(h =>
Accepts(h.Key, routingKey));
return routingPair.Value;
}
```

Figure 13:
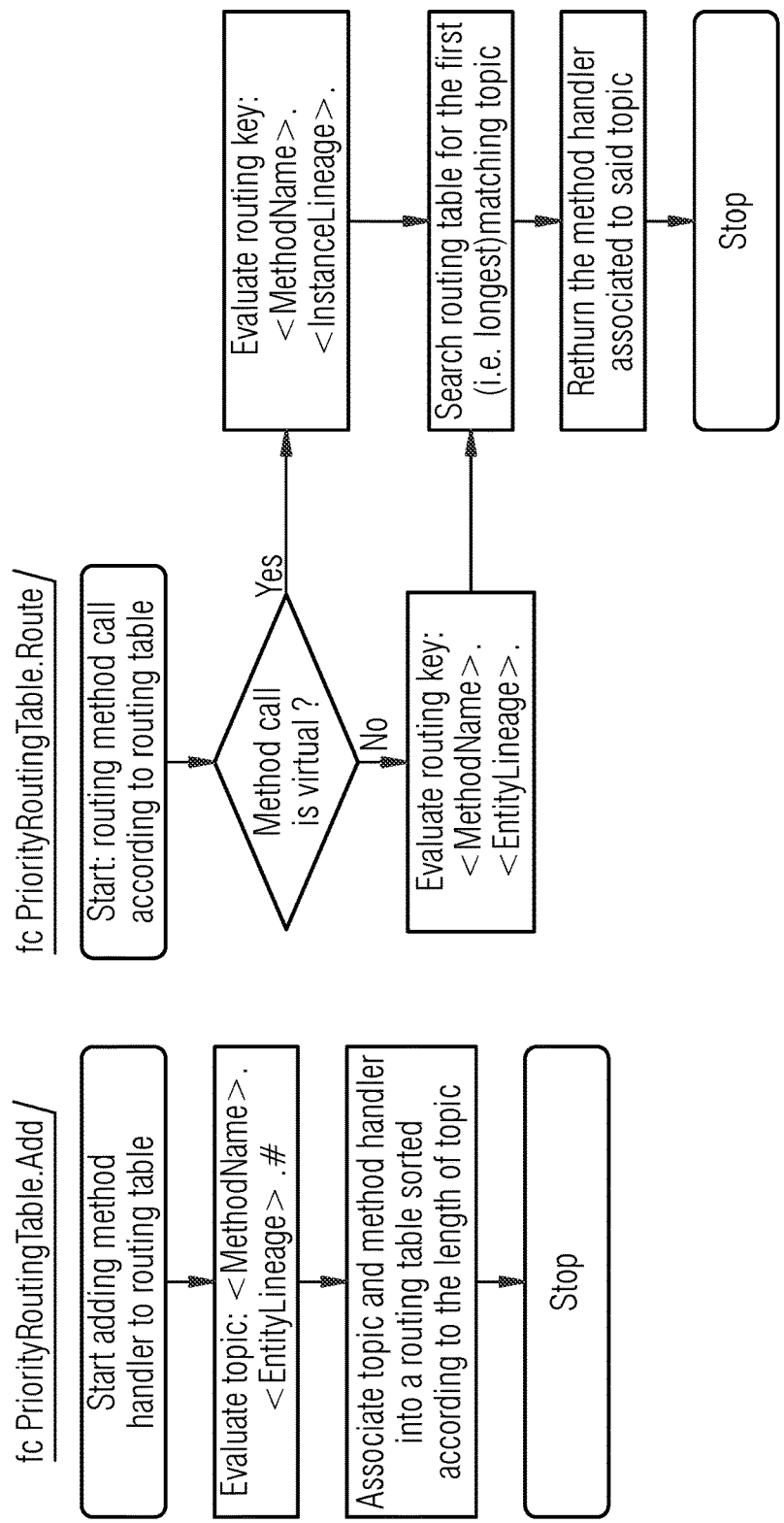
FIG. 13 is a flow chart for the priority routing table.

FIG. 13 schematically represents the flow Charts for Priority Routing Table.

Figure 14:
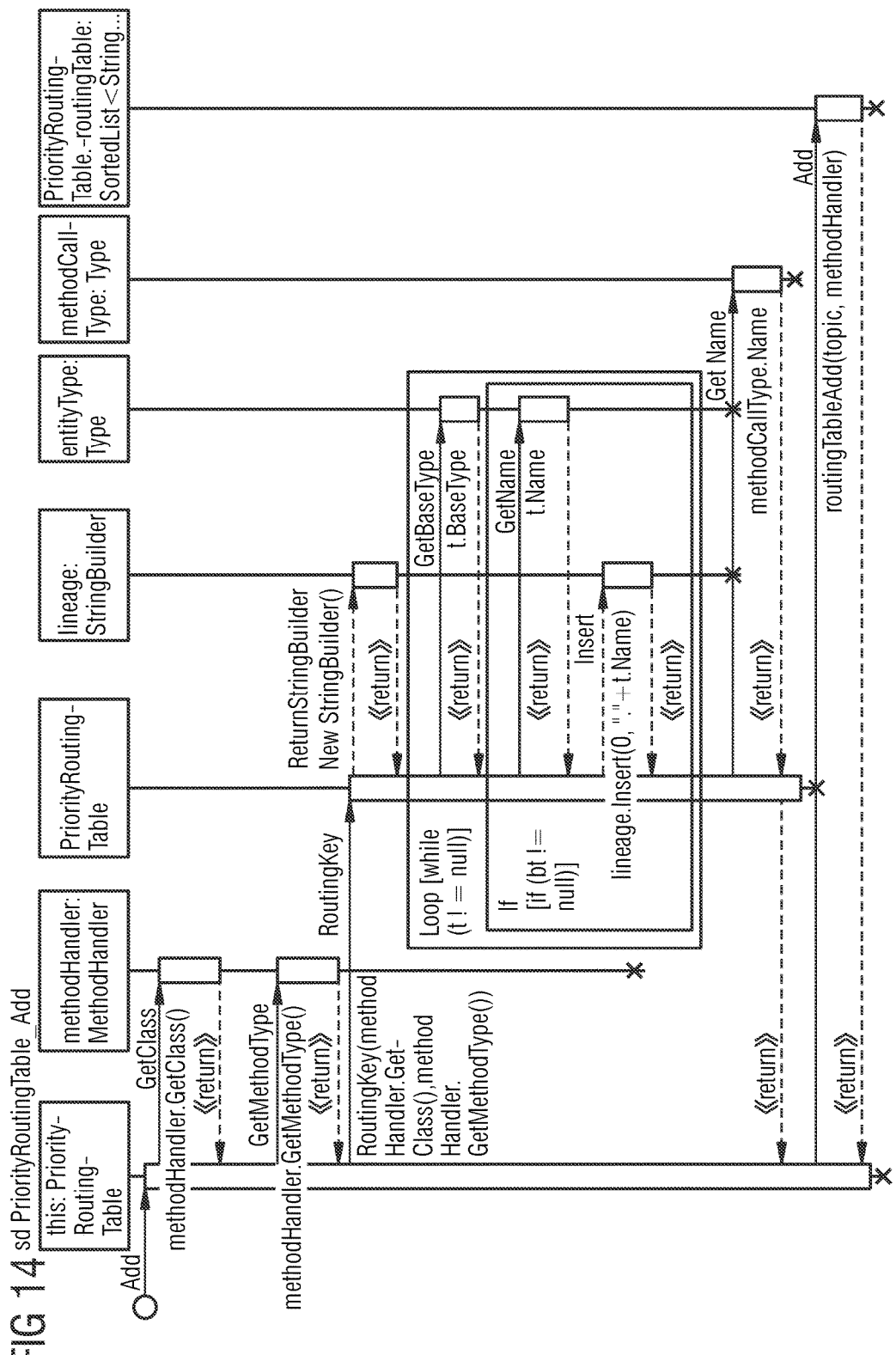
FIG. 14 is an exemplification of Sequence Diagrams for Priority Routing Table Add.
Figures 15, 15A, 15B:
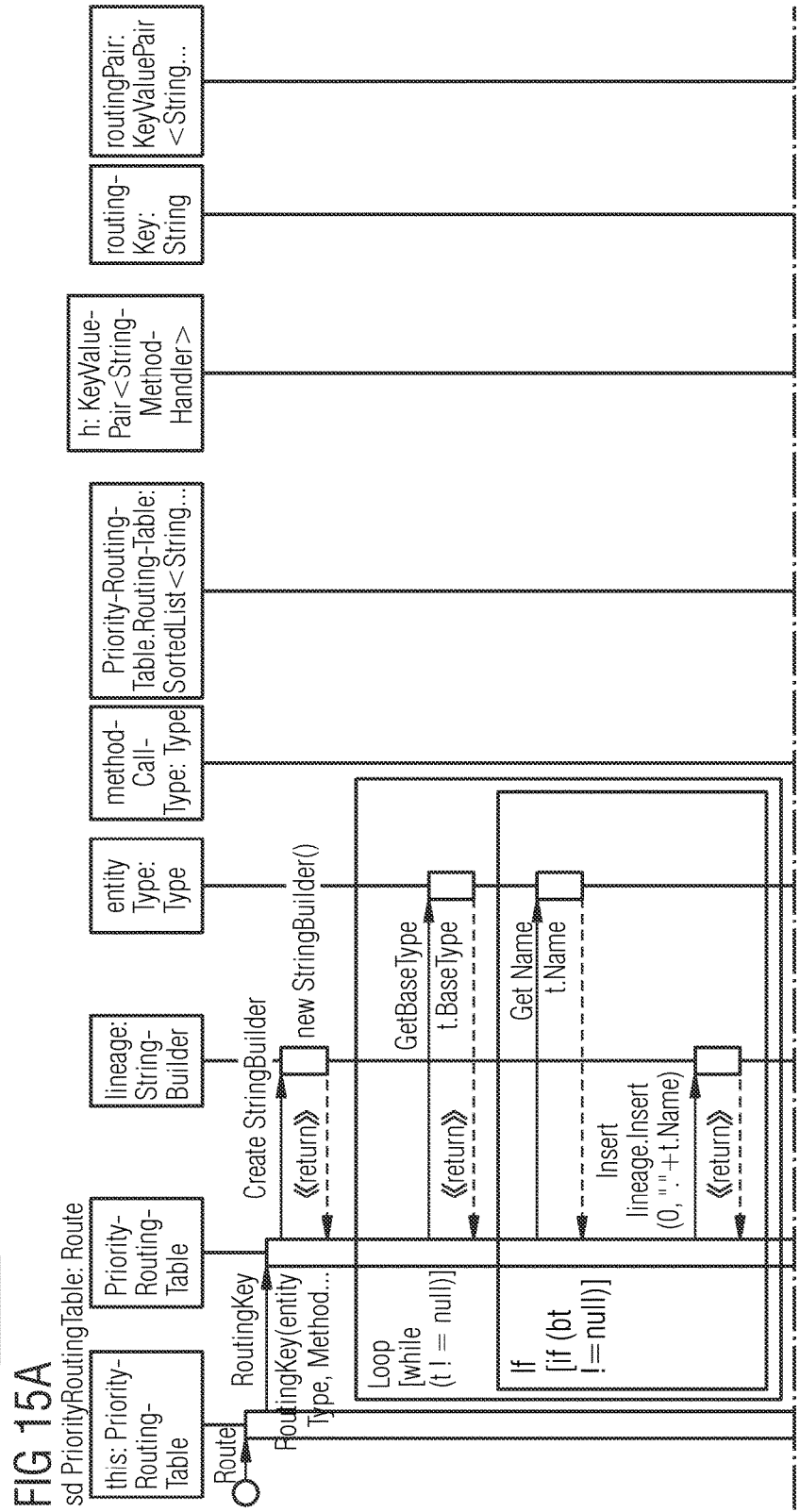
FIGS. 15, 15A and 15B are illustrations of Sequence Diagrams for Priority Routing Table Route.
Figure 15B:
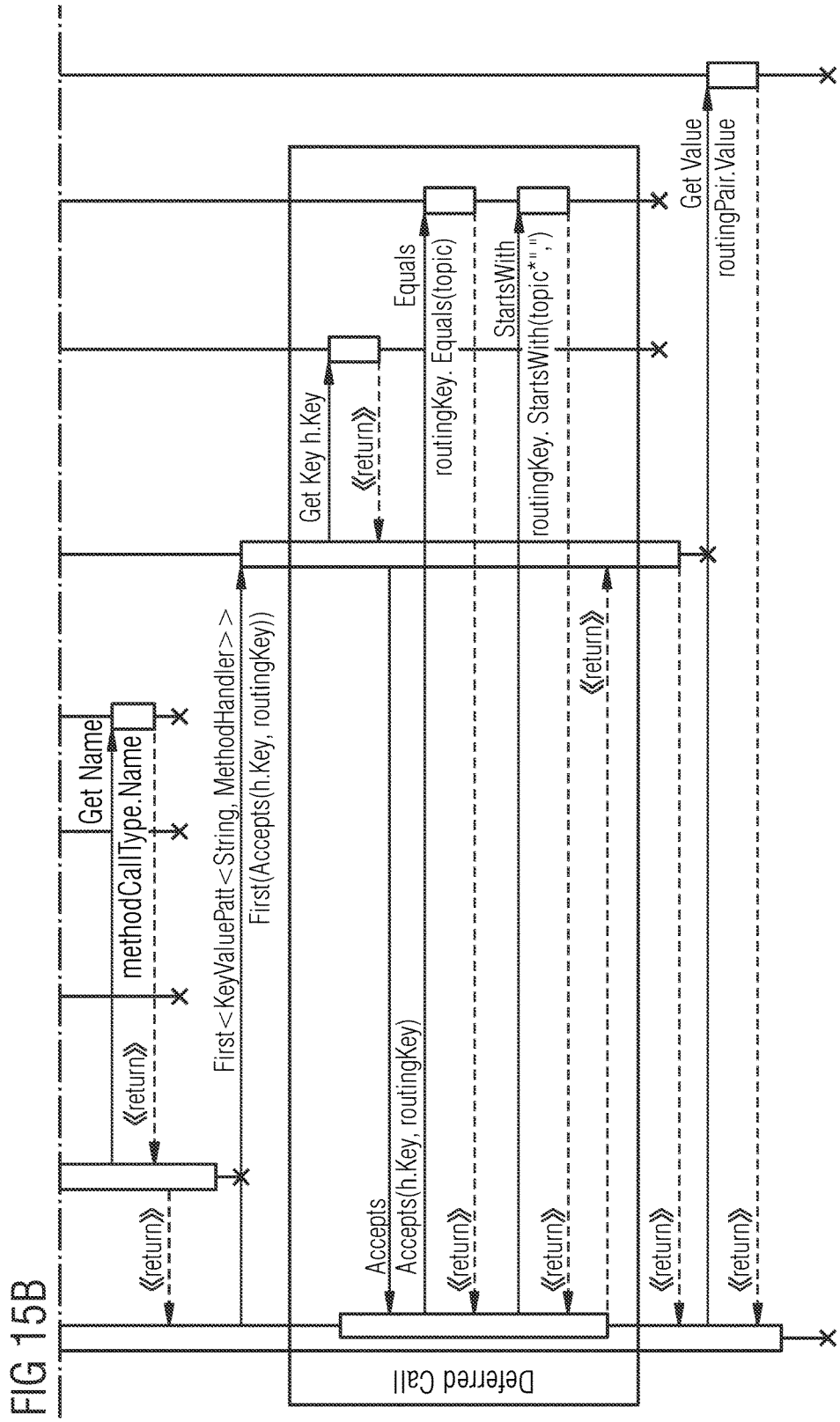

FIG. 14 is an exemplification of Sequence Diagrams for Priority Routing Table Add and FIG. 15 is an Exemplification of Sequence Diagrams for Priority Routing Table Route.

Figure 8:
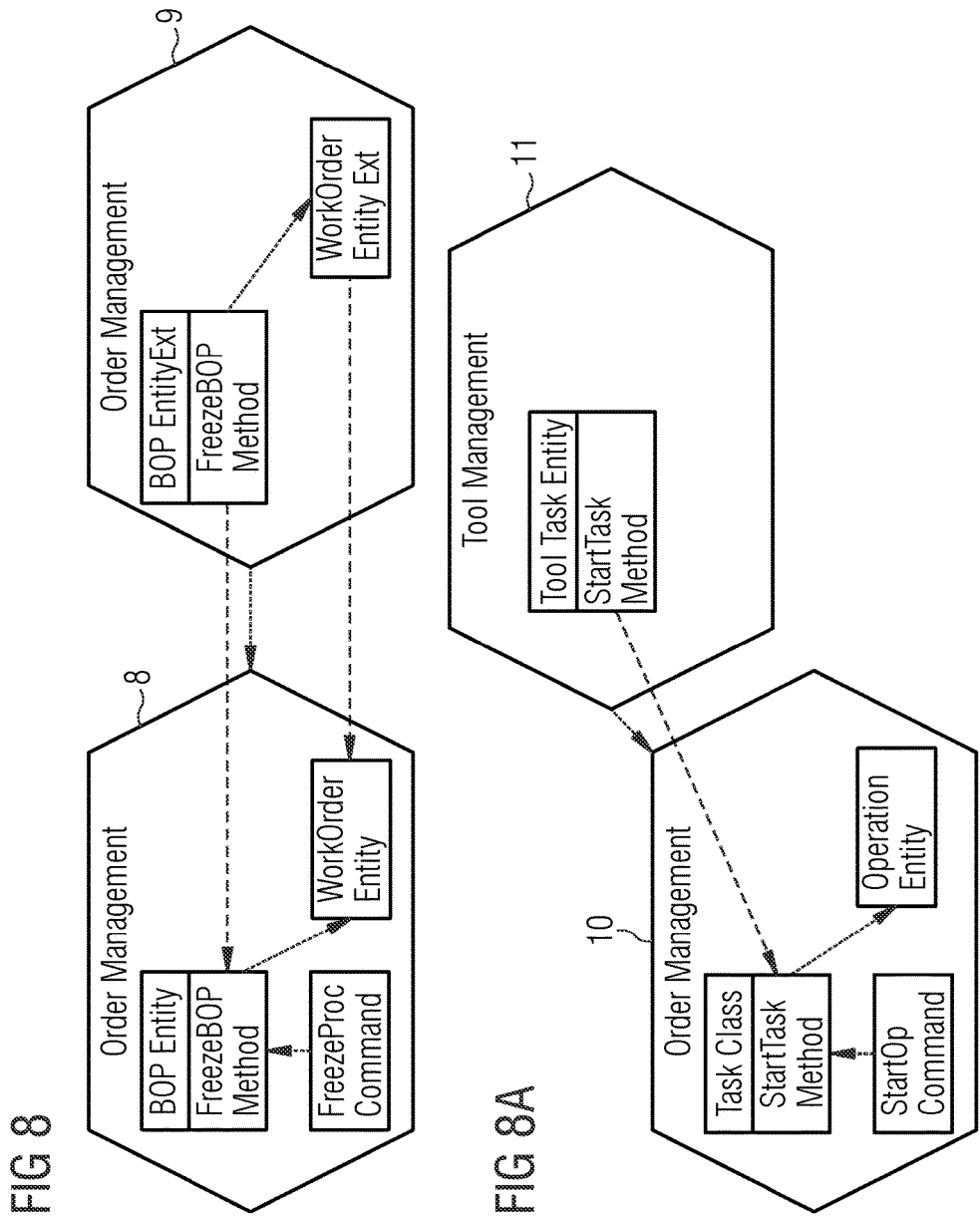
FIG. 8 is an illustration schematically representing an extension of the MES component of FIG. 7, according to the process of the present invention.
Figure 16:
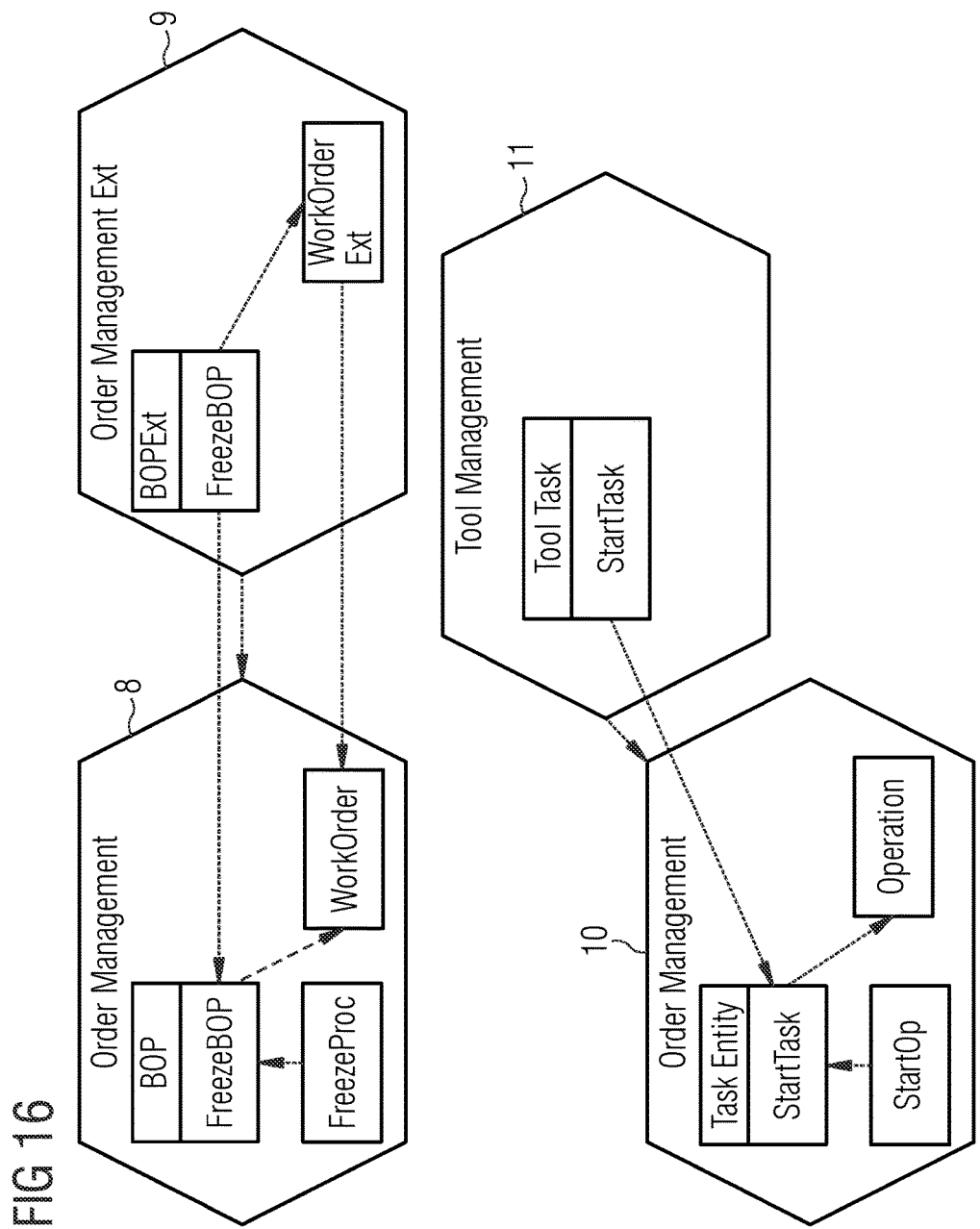
FIG. 16 is a simplified version of FIGS. 8 and 8A.

In details, with reference to FIGS. 8 and 16 (this last being a miniature of FIG. 8), different cases apply.

In the case of domains 8 and 10 of FIG. 7: Command handler will be registered with a topic of the type "<MethodName>.<EntityLineage>.#" (where "#" is a wildcard for zero or more characters), such as "FreezeBOP.BOP.#" or "StartTask.Task.#", since BOP and Task are underived entities.

Command calls will be submitted to the message routing system with a routing key of the type "<MethodName>.<EntityLineage>." and "<MethodName>.<InstanceLineage>.", such as "FreezeBOP.BOP." or "StartTask.Task.", since BOP and Task are underived entities.

The message routing system will activate the command handler having the most derived topic (i.e. lexicographically longest) matching (i.e. lexicographically 'starting with') the routing key submitted, for example "StartTask.Task.#" matches "StartTask.Task.".

In the case of extensions of entities of domains 9 and 11: Same behaviors can be exemplified by topics "FreezeBOP.BOP.BOPExt.#" or "StartTask.Task.ToolTask.#", since BOPExt (in domain 9) and ToolTask (in domain 11) are entities derived respectively from BOP and Task.

Same behavior with routing keys such as "FreezeBOP.BOP.BOPExt." when call is performed on BOPExt or "StartTask.Task.ToolTask." when call is performed on ToolTask, since BOPExt (in domain 9) and ToolTask (in domain 11) are entities derived respectively from BOP and Task. Same behavior with routing keys such as "FreezeBOP.BOP." when call is performed on BOP or "StartTask.Task." when call is performed on Task.

Same behavior with routing keys such as "FreezeBOP.BOP.BOPExt." when call is performed on a BOPExt variable or "StartTask.Task.ToolTask." when call is performed on a ToolTask variable. Same behavior with routing keys such as "FreezeBOP.BOP." when call is performed on a BOP variable or "StartTask.Task." when call is performed based on a Task variable.

The message routing system will activate the command handler having the most derived topic (i.e. lexicographically longest) matching (i.e. lexicographically 'starting with') the routing key submitted, for example "StartTask.Task.ToolTask.#" matches "StartTask.Task.ToolTask." before "StartTask.Task.#".

Figure 18:
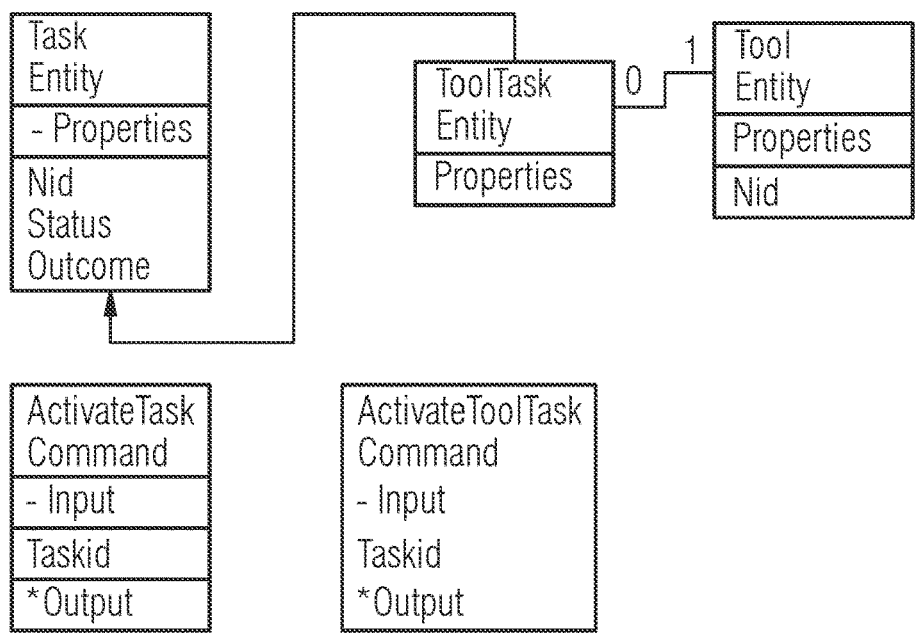
FIG. 18 is an illustration schematically representing a base and an extended entity with, respectively, a corresponding command and extended command to activate the entities, according to a method of the prior art.
Figure 19:
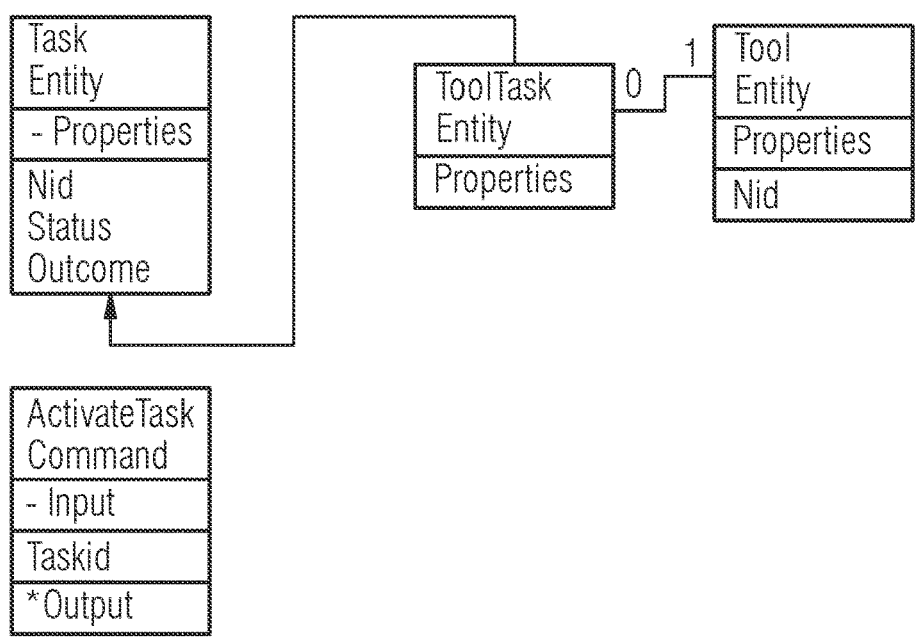
FIG. 19 is an illustration schematically representing the base and the extended entities of FIG. 19, and a single command to activate the base or the extended entity, according to the method of the present invention.

With reference to FIGS. 18 and 19, differences and advantages of the method of the present invention (FIG. 19) over a prior art method (FIG. 18) are presented, making reference to portions of code.

In both figures a base entity "task" and an extended entity "toolTask" are represented.

According to the prior art method, one command has only one command handler. Therefore, command "activateTask" is defined for the base entity "task" and a specialized (extended) command "activateToolTask" is defined for the extended entity "ToolTack".

The above commands according to the prior art method have trivial routing keys "ActivateTask" and "ActivateToolTask". The routing keys relates to commands having different names ("ActivateTask" and "ActivateToolTask").

A call to these commands is implemented as follows: Platform. CallCommand(new ActivateTask(taskId)); and Platform. CallCommand(new ActivateToolTask(toolTaskId));

The command handler for "ActivateTask" may be as follows:

```
Declaration of Activate Task Handler (topic: "Activate Task")
[Handler(HandlerCategory.BasicMethod)]
public partial class ActivateTaskHandlerShell
{
[HandlerEntryPoint]
private ActivateTask.Response ActivateTaskHandler(ActivateTask command)
{
var task = Platform. GetEntity < ITask > (command.TaskId);
task. Status = "Activated";
Platform.Submit(task);
return new ActivateTask.Response( );
}
}
```

The command handler for "ActivateToolTask" is a code reduplication of the command handler for "ActivateTask", with the specific code added (underlined below):
Declaration of Activate Tool Task Handler (topic:

```
"ActivateToolTask")
[Handler(HandlerCategory.BasicMethod)]
public partial class ActivateToolTaskHandlerShell
{
[HandlerEntryPoint]
private ActivateToolTask.Response ActivateToolTaskHandler(ActivateToolTask
command)
{
a)   var task = Platform.GetEntity<IToolTask>(command.TaskId);
b)   vartool = Platform.Automation.Read(task.Tool);
c)   tool.Activated = true;
d)   Platform.Automation.Write(tool);
e)   task. Status = "Activated";
f)   Platform.Submit(task);
g)   return new ActivateToolTask.Response( );
}
}
```

To the contrary, according to the invention, one command may have two or more command handlers. Without changing the model (base and extended entities in FIG. 18), the new command handler is declared as linked to the ToolTask entity:

The call must provide a way to infer the routing key (lineage string), providing one of the following:
1. Entity type
2. Id of an Entity E.g., with a wrapper decorating commands with an entity type:
Platform. CallCommand(new CommandContext<ITask> (new ActivateTask(taskId)));
Platform. CallCommand(new CommandContext<IToolTask>(new ActivateTask(tool-TaskId)));

The model remains the same end the code for the new entity does not need to define a new command. In this respect, ActivateToolTask is not defined, according to the method of the present invention.

```
[Handler(HandlerCategory.BasicMethod)]
public partial class ActivateToolTaskHandlerShell
{
[HandlerEntryPoint]
private ActivateTask.Response ActivateToolTaskHandler(ActivateTask
command)
{
```

-continued

```
a)   var task = Platform.GetEntity<IToolTask>(command.TaskId);
b)   vartool = Platform.Automation.Read(task.Tool);
c)   tool.Activated = true;
d)   Platform.Automation.Write(tool);
e)   task. Status = "Activated";
f)   Platform.Submit(task);
g)   return new ActivateTask.Response( );
}
}
```

Topics Change as Follows:
Activate Task Command (routing key: "ActivateTask.Task.#")
Activate Task Handler (topic: "ActivateTask.Task.")
Activate Tool Task Handler (topic: "ActivateTask.Task.ToolTask.")

The routing policy will select the longest topic matching (i.e. starting with) the routing key.

The topic of the command handler in prior art method is the name of the command ("<MethodName>") while, according to the present invention, it further includes the lineage ("<MethodName>.<Lineage>.").

In the example given with FIG. 19, the MES lineage contextualized entity is the base entity "Task", the command is "ActivateTask", the lineage of the MES lineage contextualized entity is "Task", and the step of "contextualizing the command with the MES lineage contextualized entity" is implemented by the wrapper decorating command "CommandContext" in the code Platform.CallCommand(new CommandContext<ITask> (new ActivateTask(taskId))).

Still with reference to FIG. 19, the extended MES lineage contextualized entity is "ToolTask" and the extended entity contextualized command is the same command "ActivateTask", wherein the step of "contextualizing the extended command with the extended MES lineage contextualized entity" is implemented by the wrapper decorating command "CommandContext" in the code Platform. CallCommand(new CommandContext<ITask> (new ActivateTask(taskId))).

In the message routing system it is registered a first handler (ActivateTask.Task) of the command (ActivateTask), in association with the lineage of the MES lineage contextualized entity (Task), and a second handler (ActivateTask@Task.ToolTask) of the command (ActivateTask), in association with the lineage of the MES extended lineage contextualized entity (Task.ToolTask).

The communication of a domain with another domain through the messaging routing system includes delivering from a domain a message on the messaging routing system including the name of the command (ActivateTask) and the MES lineage contextualized entity (ActivateTask@Task) or the extended MES lineage contextualized entity (ActivateTask@Task.ToolTask).

The messaging routing system selects the first handler (ActivateTask@Task), for executing the functionality, or the second handler (ActivateTask@Task.ToolTask), for executing the extended functionality, based on a mapping between the lineage registered in the messaging routing system for the first and second handlers, and a lineage derived from said message in the messaging routing system.

Here below the advantages of the process of the present invention are summarized.

The process of the present invention allows to:
a) address command calls in a way similar to that of Object Oriented Programming, although a not polymorphic paradigm is used to define commands and entities;
b) extend existing entities with new properties;
c) modeling according to the domain driven design;
d) use a routing procedure integrated in the message routing system, capable to deliver to the correct procedure handler (i.e. command handler).
e). It is possible to leverage the power, simplicity and elegance of contextualized commands in a modern architecture based on polymorphism and message routing system architecture, event when not polymorphic paradigm are used.

This advantage is apparent with respect to a message routing system architecture not including contextualized commands.

i) Simulated OOP Design:

The software tool devised in the invention gives the possibility of designing architectures based on a message routing system with polymorphic features, so the software engineer is free to use common or simulated OOP patterns (for instance, Visitor pattern to implement multiple dispatch).

i) Class Based Dependency Update:

If some entity contextualized command are not overridden in a derived entity, the depending callers (e.g. FreezeProc Command) which make use of new instances will automatically, in any domain, start the new logic contained in the latter version by calling the old command call; dependent code behaviors adapts dynamically.

i) Code Reuse:

If the base code (e.g. based on behavior regarding the security constraints, common to the two versions) changes, the code will have to be modified in the base versions: the first call in derived command will usually be that of calling the base command. If Version 1 is not useful anymore, for instance in case of obsolescence, code will still be used in subsequence builds.

i) Applicability of Liskov Substitution Principle (LSP):

The behavior of calls will be transparent to the developers and analyst: new instances will trigger new behaviors (functionalities); old instances will trigger old behaviors. In case a behavior has not been overridden, calls will still trigger old behaviors. In case a behavior must not depend on runtime instances, calls will still be viable.

i) Cyclomatic Low Complexity:

Since all scenarios require the developer to adjust well identified sections of code, no interlocking between old and new logic is called for.

Figure 17:
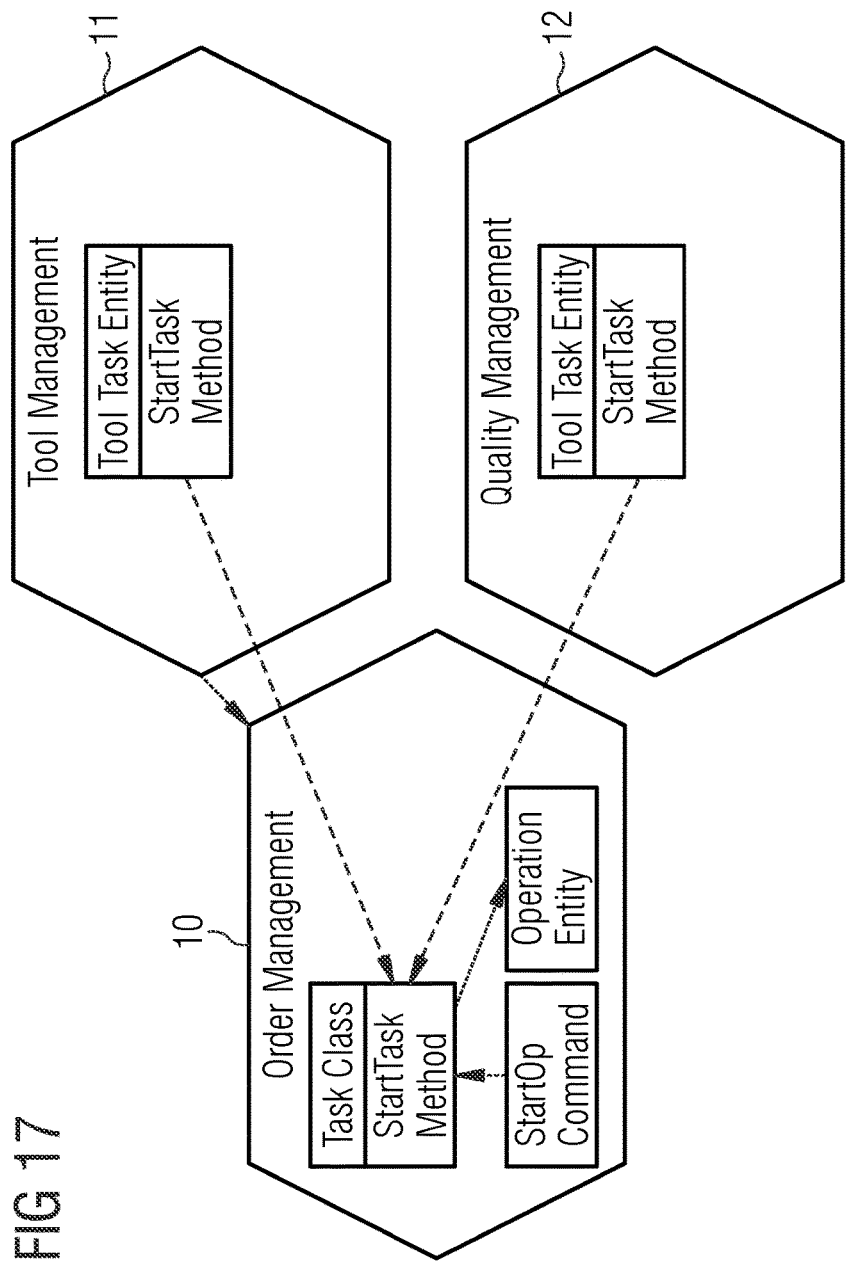
FIG. 17 is an illustration schematically representing a further extension of the MES component of FIG. 8A overridden by two peripheral domains (MES components), according to the process of the present invention, based on the possibility to invoke polymorphic behaviors.

FIG. 17 is a schematic representation of the core base domain overridden by two peripheral Domain Driven Design domains.

Further benefits associated to the process of the present invention are:

Ease to Find Skill:

The possibility to leverage on typical OOP features makes easier to find software engineers proficient in the skill, with no need to train in specific design practices.

Local impacts on development and deploy in case of changes:

When a behavior changes, there is no need to look for and this can reduce the time to carry out changes and minimize the risk to introduce bugs in the software. It also eases the process of delivering to production environments, since fewer modules will have to be replaced with new versions.

Code Reuse:

Code reuse can reduce the risk to introduce regression bugs and makes software life cycle easier, resulting in better quality software.

Backward Compatibility:

Since old instances will automatically show old behavior, backward compatibility is assured with no change in the source code, granting software a longer life span.

Stable and Minimal Software:

Scenarios are stable after each step of software update (the creation of new classes, the creation of new property, the development of new commands, the use of the code), so each modification can be gradual and tested in smaller steps.

The modifications needed are less and the number of classes does not increase exponentially. More compact and easy code is easier to maintain, reducing the risk of regression bugs.

The invention claimed is:

1. A process to extend a functionality of a manufacturing execution system (MES) in a computer managed manufacturing execution system (CMMES) based on a messaging routing system for controlling discrete production lines and/or automotive industries, which comprises the steps of:
implementing a MES functionality in a domain of a domain driven design used to design the MES, the domain including at least a MES lineage contextualized entity and a command, wherein a lineage of the MES lineage contextualized entity is a recursively resolved inheritance string of the MES lineage contextualized entity and a context of the MES lineage contextualized entity is a model of the domain with predetermined boundaries in which an entity is defined, the domain being programmed to communicate to at least another domain of the domain driven design of the MES through a message of the messaging routing system;

selecting the command implementing the functionality to be extended;

contextualizing the command with the MES lineage contextualized entity to obtain an entity contextualized command, the step of contextualizing including encapsulating and hiding the entity contextualized command into the MES lineage contextualized entity;

extending the MES lineage contextualized entity and the entity contextualized command which implements a selected functionality, to obtain an extended MES lineage contextualized entity and an extended entity contextualized command, corresponding to an extended functionality, the step of extending including encapsulating and hiding the extended entity contextualized command into the extended MES lineage contextualized entity; and registering into the message routing system a first handler of the command, in association with the lineage of the MES lineage contextualized entity, and a second handler of the command, in association with the lineage of the extended MES lineage contextualized entity, wherein a communication of the domain with at least the another domain through the messaging routing system includes delivering from the domain a message on the messaging routing system including a name of the command and the MES lineage contextualized entity or the extended MES lineage contextualized entity, and wherein the messaging routing system selects the first handler, for executing the functionality, or the second handler, for executing the extended functionality, based on a mapping between a lineage registered in the messaging routing system for the first and second handlers, and a lineage derived from the message in the messaging routing system.

2. The process according to claim 1, wherein the step of registering into the messaging routing system the lineages further comprises:

storing, in association with the first handler, a first string including, through concatenation with a special character, the name of the command and the name of the MES lineage contextualized entity, and, in association with the second handler, a second string including, through concatenation with a special character, the name of the command with the name of the MES lineage contextualized entity and with the name of the extended lineage contextualized MES entity.

3. The process according to claim 1, which further comprises deriving the lineage from the message in the message routing system by forming a topic string obtained by:

if the message includes the extended MES lineage contextualized entity, deriving the MES lineage contextualized entity from the extended MES lineage contextualized entity and forming the topic string by concatenating recursively in the message routing system the name of the MES lineage contextualized entity with the name of the extended MES lineage contextualized entity and the name of the command; and if the message includes the MES lineage contextualized entity, forming the topic string by concatenating in the message routing system the name of the MES lineage contextualized entity with the name of the command.

4. The process according to claim 1, which further comprises further extending at least one of the extended MES lineage contextualized entity and the command, to obtain a further extended functionality;

wherein the step of registering registers a further handler of the command including a lineage of a further extended MES lineage contextualized entity;

wherein a communication is made delivering on the message routing system the message including the command and the further extended MES lineage contextualized entity; and wherein the message routing system selects the further handler when the lineage registered in the message routing system for the further handler is mapped to a lineage derived from the message in the message routing system.

5. The process according to claim 2, wherein the step of registering the handlers of the command in the message routing system includes:

storing the first string and the second string, as a first and second routing key, in a routing table of the message routing system;

mapping the first and second routing keys to the first and second handlers, respectively; and performing the step of mapping the lineage registered in the message routing system for the command and the lineage derived from the message in the message routing system by finding a routing key in the routing table having a longest lexicographic similarity with the topic string.

6. The process according to claim 5, wherein the routing table includes at least two interfaces, including:

an interface "Add functionality" to register a handler in the routing table;

an interface "Route functionality" to map a routing key to the handler, wherein the "Route functionality" returns the handler associated to the routing key matching the lineage derived from the message in the message routing system, by means of the following steps:

selecting from the routing table all routing keys starting with letters corresponding to the name of the command in the message;

among selected routing keys, finding a deeper routing key, wherein a routing key is deeper than another routing key among the selected routing keys when the routing key includes more MES lineage contextualized entities concatenated with a special character than the another routing key, the deeper routing key corresponds to a most extended functionality; and returning the handler associate to the deeper routing key.

7. The process according to claim 1, wherein the domain driven design includes a plurality of servers, each server implementing one of the domain and communicating to another server through the message routing system.

8. The process according to claim 1, wherein each of the domains belong to a first layer of the domain driven design and the message routing system belongs to a second layer at a lower level in the domain driven design with respect to the first layer, wherein the second layer includes handlers of commands and the message is delivered to the message routing system from the first layer being unaware of a handler.

9. The process according to claim 1, wherein each of the MES lineage contextualized entity and the commands are contextualized together and the MES lineage contextualized entity and the entity contextualized command have a polymorphic behavior.

10. A system to extend a functionality of a manufacturing execution system (MES) in a computer managed manufacturing execution system (CMMES) based on a message routing system for controlling discrete production lines and/or automotive industries, the system comprising:

a computer to: implement an MES functionality in a domain of a domain driven design used to design the MES, said domain including at least a MES lineage contextualized entity and a command, a lineage of the MES lineage contextualized entity is a recursively resolved inheritance string of the MES lineage contextualized entity and a context of the MES lineage contextualized entity is a model of said domain with predetermined boundaries, in which an entity is defined, the domain being programmed to communicate to at least another domain of the domain driven design in the MES through a message of the message routing system; select the command implementing the functionality to be extended; contextualize the command with the MES lineage contextualized entity to obtain an entity contextualized command, the contextualize step includes a tool for importing the entity contextualized command into a portion of the MES lineage contextualized entity which is hidden outside the MES lineage contextualized entity; extending the MES lineage contextualized entity and the entity contextualized command which implement a selected functionality, to obtain an extended MES lineage contextualized entity and an extended entity contextualized command, corresponding to an extended functionality, the step of extending including a tool for importing the extended entity contextualized command into a portion of the extended MES lineage contextualized entity which is hidden outside the extended MES lineage contextualized entity; register into the message routing system a first handler of the command, in association with the lineage of the MES lineage contextualized entity, and a second handler of the command, in association with the lineage of the MES extended lineage contextualized entity; and deliver from the domain the message on the messaging routing system including a name of the command and the MES lineage contextualized entity or the extended MES lineage contextualized entity to communicate between the domain and at least the another domain through the messaging routing system, wherein the messaging routing system is programmed to check a correspondence between the lineage registered in the messaging routing system for the first and second handlers, with a lineage derived from the message in the messaging routing system, and to select the first handler, for executing the functionality, or the second handler, for executing the extended functionality, based on the correspondence.

11. A non-transitory computer-readable medium comprising computer executable instructions which, when executed by a computer, cause the computer to carry out steps of method claim 1.

* * * * *